(12) United States Patent
Shao et al.

(10) Patent No.: US 12,175,435 B2
(45) Date of Patent: Dec. 24, 2024

(54) METHODS AND INTERNET OF THINGS (IOT) SYSTEMS FOR PREDICTING DEMAND FOR MAINTENANCE MATERIALS OF SMART GAS PIPELINE NETWORKS

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Junyan Zhou, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/597,850

(22) Filed: Mar. 6, 2024

(65) Prior Publication Data

US 2024/0211897 A1 Jun. 27, 2024

Related U.S. Application Data

(63) Continuation of application No. 18/186,979, filed on Mar. 21, 2023, now Pat. No. 11,966,885.

(30) Foreign Application Priority Data

Feb. 13, 2023 (CN) .......................... 202310104350.1

(51) Int. Cl.
*G06Q 10/20* (2023.01)
*G06Q 10/04* (2023.01)
(Continued)

(52) U.S. Cl.
CPC ............. *G06Q 10/20* (2013.01); *G06Q 10/04* (2013.01); *G16Y 10/35* (2020.01); *G16Y 40/40* (2020.01); *G16Y 40/50* (2020.01)

(58) Field of Classification Search
CPC .............................. G06Q 10/20; G16Y 40/50
See application file for complete search history.

(56) References Cited

U.S. PATENT DOCUMENTS

2008/0030144 A1   2/2008   Steckling
2010/0253318 A1  10/2010   Thomas, Sr.
(Continued)

FOREIGN PATENT DOCUMENTS

CN   104573877 A   4/2015
CN   105387350 A   3/2016
(Continued)

OTHER PUBLICATIONS

Notification to Grant Patent Right for Invention in Chinese Application No. 202310104350.1 mailed on Apr. 13, 2023, 9 pages.

*Primary Examiner* — Ricky Go
(74) *Attorney, Agent, or Firm* — METIS IP LLC

(57) ABSTRACT

Disclosed is a method for predicting demand for maintenance materials of a smart gas pipeline network. The method comprises: obtaining a pipeline network feature of a gas pipeline network; predicting fault probabilities of one or more point positions of the gas pipeline network based on the pipeline network feature, the fault probabilities including probabilities of one or more preset fault types of faults occurring at the point positions; determining sub-demand for the maintenance materials of each point position based on the fault probability of each point position of the one or more point positions, the sub-demand being obtained based on historical maintenance data of the gas pipeline network; determining the demand for the maintenance materials based on the sub-demand of each point position of the gas pipeline network; and transmitting the demand for the maintenance materials to the smart gas user platform based on the smart gas service platform.

20 Claims, 5 Drawing Sheets

(51) Int. Cl.
*G16Y 10/35* (2020.01)
*G16Y 40/40* (2020.01)
*G16Y 40/50* (2020.01)

(56) References Cited

U.S. PATENT DOCUMENTS

| | | |
|---|---|---|
| 2015/0320952 A1 | 11/2015 | Acker et al. |
| 2015/0320953 A1 | 11/2015 | Acker et al. |
| 2018/0275100 A1* | 9/2018 | Sutherland ............ G05D 7/0676 |
| 2018/0284758 A1 | 10/2018 | Cella et al. |
| 2020/0133257 A1 | 4/2020 | Cella et al. |
| 2020/0272177 A1 | 8/2020 | Shao |
| 2020/0293997 A1 | 9/2020 | Shao |
| 2020/0311559 A1 | 10/2020 | Chattopadhyay et al. |
| 2021/0097449 A1 | 4/2021 | Chattopadhyay et al. |
| 2021/0314183 A1 | 10/2021 | Ward et al. |
| 2021/0360070 A1* | 11/2021 | Cella ....................... H04W 4/38 |

FOREIGN PATENT DOCUMENTS

| | | |
|---|---|---|
| CN | 105731209 A | 7/2016 |
| CN | 106503864 A | 3/2017 |
| CN | 106534357 A | 3/2017 |
| CN | 106657306 A | 5/2017 |
| CN | 107944090 A | 4/2018 |
| CN | 108564280 A | 9/2018 |
| CN | 108764725 A | 11/2018 |
| CN | 109146375 A | 1/2019 |
| CN | 109164757 A | 1/2019 |
| CN | 109213013 A | 1/2019 |
| CN | 109359900 A | 2/2019 |
| CN | 109460420 A | 3/2019 |
| CN | 109767513 A | 5/2019 |
| CN | 109858126 A | 6/2019 |
| CN | 110185940 A | 8/2019 |
| CN | 110207022 A | 9/2019 |
| CN | 110222898 A | 9/2019 |
| CN | 110361418 A | 10/2019 |
| CN | 110515935 A | 11/2019 |
| CN | 110567703 A | 12/2019 |
| CN | 110672332 A | 1/2020 |
| CN | 110705176 A | 1/2020 |
| CN | 111104989 A | 5/2020 |
| CN | 111639817 A | 9/2020 |
| CN | 111914220 A | 11/2020 |
| CN | 112283592 A | 1/2021 |
| CN | 112327784 A | 2/2021 |
| CN | 112396226 A | 2/2021 |
| CN | 114021855 A | 2/2022 |
| CN | 114077635 A | 2/2022 |
| CN | 114352940 A | 4/2022 |
| CN | 114444751 A | 5/2022 |
| CN | 115330278 A | 11/2022 |
| CN | 115358432 A | 11/2022 |
| CN | 115439003 A | 12/2022 |
| CN | 115511666 A | 12/2022 |
| CN | 115619071 A | 1/2023 |
| EP | 3139986 A1 | 3/2017 |
| EP | 3581226 A2 | 12/2019 |

* cited by examiner

400

```
┌─────────────────────────────────────────────────────────┐
│ Determining sub-demand for the maintenance materials of │
│ each point position based on the fault probability of each │  ⎱ 410
│ point position of the one or more point positions, the sub-│
│ demand being obtained based on historical maintenance   │
│ data of the gas pipeline network                        │
└─────────────────────────────────────────────────────────┘
                            │
                            ▼
┌─────────────────────────────────────────────────────────┐
│ Determining the demand for the maintenance materials    │  ⎱ 420
│ based on the sub-demand of each point position of the   │
│ gas pipeline network                                    │
└─────────────────────────────────────────────────────────┘
```

FIG. 4

METHODS AND INTERNET OF THINGS (IOT) SYSTEMS FOR PREDICTING DEMAND FOR MAINTENANCE MATERIALS OF SMART GAS PIPELINE NETWORKS

CROSS-REFERENCE TO RELATED APPLICATION

This application is a continuation of U.S. application Ser. No. 18/186,979, field on Mar. 21, 2023, which claims priority of Chinese Application No. 202310104350.1, filed on Feb. 13, 2023, the entire contents of each of which are hereby incorporated by reference.

TECHNICAL FIELD

The present disclosure relates to the field of maintenance of a gas pipeline network, and in particular, to methods and Internet of Things (IOT) systems for predicting demand for maintenance materials of a smart gas pipeline network.

BACKGROUND

The use of gas is an important part of life. However, various faults are inevitable during the operation of the gas pipeline network. In order to be able to quickly respond to the maintenance of gas faults, in addition to the timely arrival of maintenance personnel, it is also necessary to provide corresponding maintenance materials. Especially for some relatively serious faults or accidents, relatively high requirements are put forward for the rapid and timely scheduling and deployment of the maintenance materials. In addition, there are many types of maintenance materials, and there is a certain correlation between the combinations of different maintenance materials. Therefore, how to predict possible gas faults of the gas pipeline network in the future based on the current operation conditions of the gas pipeline network to rationally allocate and reserve maintenance materials is a major challenge in the field of gas pipeline network maintenance.

Therefore, it is desirable to provide methods and Internet of Things (IoT) systems for predicting demand for maintenance materials of a smart gas pipeline network, which can help to quickly and effectively determine a fault point of the gas pipeline network, realize the rapid scheduling and allocation of the maintenance materials, and improve the rationality of utilization of maintenance materials.

SUMMARY

One of the embodiments of the present disclosure provides a method for predicting demand for maintenance materials of a smart gas pipeline network. The method may be implemented based on a smart gas safety management platform of an Internet of Things (IOT) system for predicting demand for maintenance materials of a smart gas pipeline network. The IoT system may comprise a smart gas user platform, a smart gas service platform, a smart gas sensor network platform, and a smart gas object platform. The smart gas user platform may include a gas user sub-platform and a supervision user sub-platform. The smart gas service platform may include a smart gas use service sub-platform corresponding to the gas user sub-platform, and a smart supervision service sub-platform corresponding to the supervision user sub-platform. The smart gas safety management platform may include a smart gas emergency maintenance management sub-platform and a smart gas data center. The smart gas emergency maintenance management sub-platform may include a device safety monitoring management module, a safety alarm management module, a work order dispatch management module, and a material management module. The smart gas sensor network platform may include a smart gas device sensor network sub-platform and a smart gas maintenance engineering sensor network sub-platform. The smart gas object platform may include a smart gas device object sub-platform and a smart gas maintenance engineering object sub-platform. The method may comprise: obtaining a pipeline network feature of a gas pipeline network; predicting fault probabilities of one or more point positions of the gas pipeline network based on the pipeline network feature, the fault probabilities including probabilities of one or more preset fault types of faults occurring at the point positions; determining sub-demand for the maintenance materials of each point position based on the fault probability of each point position of the one or more point positions, the sub-demand being obtained based on historical maintenance data of the gas pipeline network; determining the demand for the maintenance materials based on the sub-demand of each point position of the gas pipeline network; and transmitting the demand for the maintenance materials to the smart gas user platform based on the smart gas service platform.

One of the embodiments of the present disclosure provides an Internet of Things (IOT) system for predicting demand for maintenance materials of a smart gas pipeline network. The IoT system may comprise a smart gas user platform, a smart gas service platform, a smart gas safety management platform, a smart gas sensor network platform, and a smart gas object platform. The smart gas user platform may include a gas user sub-platform and a supervision user sub-platform. The smart gas service platform may include a smart gas use service sub-platform corresponding to the gas user sub-platform, and a smart supervision service sub-platform corresponding to the supervision user sub-platform. The smart gas safety management platform may include a smart gas emergency maintenance management sub-platform and a smart gas data center. The smart gas emergency maintenance management sub-platform may include a device safety monitoring management module, a safety alarm management module, a work order dispatch management module, and a material management module. The smart gas sensor network platform may include a smart gas device sensor network sub-platform and a smart gas maintenance engineering sensor network sub-platform. The smart gas object platform may include a smart gas device object sub-platform and a smart gas maintenance engineering object sub-platform. The smart gas object platform may be configured to obtain a pipeline network feature of a gas pipeline network, and transmit the pipeline network feature to the smart gas safety management platform through the smart gas sensor network platform. The smart gas safety management platform may be configured to predict fault probabilities of one or more point positions of the gas pipeline network based on the pipeline network feature, the fault probabilities including probabilities of one or more preset fault types of faults occurring at the point positions; determine sub-demand for the maintenance materials of each point position based on the fault probability of each point position of the one or more point positions, the sub-demand being obtained based on historical maintenance data of the gas pipeline network; determine the demand for the maintenance materials based on the sub-demand of each point position of the gas pipeline network; transmit the demand for the maintenance materials to the smart gas user platform based on the smart gas service platform; and send the demand for the maintenance materials to the smart gas maintenance engineering object sub-platform based on the smart gas maintenance engineering sensor network sub-platform.

One of the embodiments of the present disclosure provides a non-transitory computer-readable storage medium storing computer instructions. When reading the computer instructions in the storage medium, a computer may implement the method for predicting demand for maintenance materials of a smart gas pipeline network.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein:

FIG. 4 is a flowchart illustrating an exemplary process for determining demand for maintenance materials of each point position according to some embodiments of the present disclosure.

DETAILED DESCRIPTION

Figure 1:
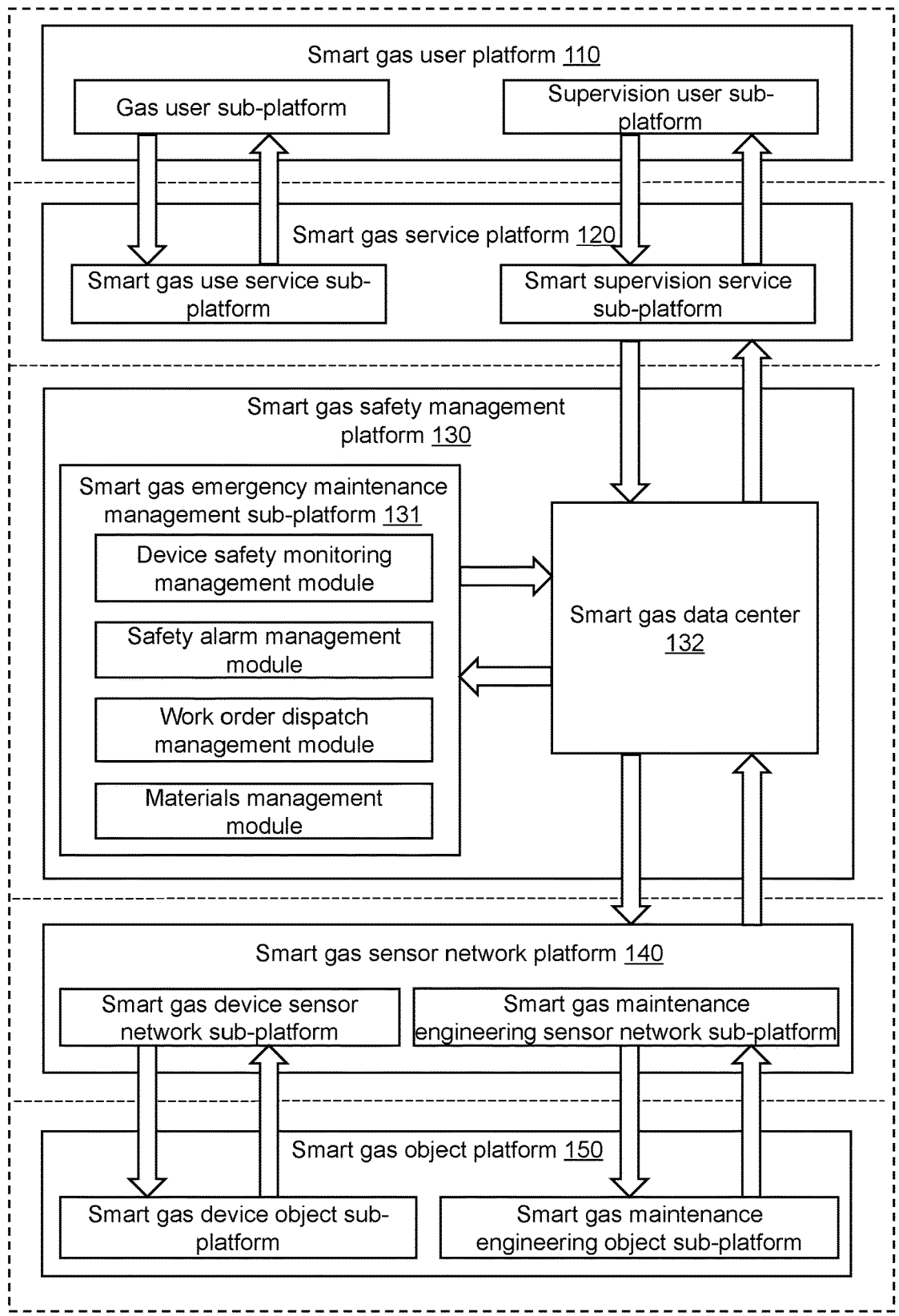
FIG. 1 is a schematic diagram illustrating an exemplary structure of an Internet of Things (IoT) system for predicting demand for maintenance materials of a smart gas pipeline network according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the present disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

FIG. 1 is a schematic diagram illustrating an exemplary structure of an Internet of Things (IOT) system 100 for predicting demand for maintenance materials of a smart gas pipeline network according to some embodiments of the present disclosure. The IoT system 100 for predicting demand for maintenance materials of a smart gas pipeline network according to the embodiments of the present disclosure is described in detail below. It should be noted that the embodiments are merely for the purpose of illustration of the present disclosure, and not intended to limit the present disclosure.

The IoT system may be an information processing system including some or all of a user platform, a service platform, a management platform, a sensor network platform, and an object platform. The user platform may be a functional platform that realizes perceptual information obtaining and control information generation of a user. The service platform may realize connection between the management platform and the user platform, and play functions of perceptual information service communication and control information service communication. The management platform may overall plan and coordinate connection and collaboration among various functional platforms (e.g., the user platform and the service platform). The management platform may gather information of an IoT operation system, and may provide functions of perception management and control management for the IoT operation system. The sensor network platform may be a functional platform for managing sensor communication. In some embodiments, the sensor network platform may connect the management platform and the object platform to realize functions of perceptual information sensor communication and control information sensor communication. The object platform may be a functional platform for generating perceptual information.

In some embodiments, when applied to gas management, the IoT system may be called an IoT system of smart gas.

In some embodiments, as shown in FIG. 1, the IoT system 100 for predicting demand for maintenance materials of a smart gas pipeline network (hereinafter referred to as the IoT system 100 for short) may include a smart gas user platform 110, a smart gas service platform 120, a smart gas safety management platform 130, a smart gas sensor network platform 140, and a smart gas object platform 150.

The smart gas user platform 110 may be a platform for interacting with a user. The user may be a gas user, a supervision user, etc. In some embodiments, the smart gas user platform 110 may be configured as a terminal device. For example, the terminal device may include a mobile device, a tablet computer, or the like, or any combination thereof. In some embodiments, the smart gas user platform 110 may be used to receive information and/or an instruction. For example, the smart gas user platform 110 (e.g., a supervision user sub-platform) may obtain a maintenance materials scheduling plan of each point position of the gas pipeline network through the terminal device. In some embodiments, the smart gas user platform 110 may send a request and/or an instruction inputted by the user to the smart gas service platform 120, and obtain the maintenance materials scheduling plan of each point position of the gas pipeline network fed back by the smart gas service platform 120.

In some embodiments, the smart gas user platform 110 may include a gas user sub-platform and a supervision user sub-platform. The gas user sub-platform may correspond to a smart gas use service sub-platform. For example, the gas user sub-platform may send reminder information, alarm information, etc. of gas use to the gas user through the terminal device. The supervision user sub-platform may correspond to a smart supervision service sub-platform. In some embodiments, the supervision user may supervise and manage safe operation of the IoT system 100 through the supervision user sub-platform to ensure safe and orderly operation of the IoT system 100.

The smart gas service platform 120 may be a platform for conveying needs and control information of the user. The smart gas service platform 120 may be connected to the smart gas user platform 110 and the smart gas safety management platform 130. The smart gas service platform 120 may obtain gas device safety information (e.g., fault information) and scheduling information of the maintenance materials from the smart gas safety management platform 130 (e.g., a smart gas data center 132), and send the gas device safety information and scheduling information of the maintenance materials to the smart gas user platform 110. In some embodiments, the smart gas service platform 120 may include a processing device and other components. The processing device may be a server or a server group.

In some embodiments, the smart gas service platform 120 may include the smart gas use service sub-platform and the smart supervision service sub-platform. The smart gas use service sub-platform may be a platform that provides a gas use service for the gas user. The smart gas use service sub-platform may correspond to the gas user sub-platform. For example, the smart gas use service sub-platform may send information such as a gas bill of the gas user, gas use safety guidelines, and a gas use abnormality reminder to the gas user sub-platform. The smart supervision service sub-platform may be a platform that provides a supervision need for the supervision user. The smart supervision service sub-platform may correspond to the supervision user sub-platform. For example, the smart supervision service sub-platform may send the safety management information of the gas device, the scheduling information of the maintenance materials of the gas pipeline network, and maintenance information of the gas device to the supervision user sub-platform.

The smart gas safety management platform 130 may refer to a platform that overall plans and coordinates the connection and collaboration among various functional platforms, gathers all the information of the IoT, and provides the functions of perception management and control management for the IoT operation system. In some embodiments, the smart gas safety management platform 130 may include a processing device and other components. The processing device may be a server or a server group. In some embodiments, the smart gas safety management platform 130 may be a remote platform controlled by the user, artificial intelligence, or a preset rule.

In some embodiments, the smart gas safety management platform 130 may include a smart gas emergency maintenance management sub-platform 131 and a smart gas data center 132.

The smart gas emergency maintenance management sub-platform 131 may be a platform for analyzing and processing gas emergency maintenance management data. In some embodiments, the smart gas emergency maintenance management sub-platform 131 may perform a bidirectional interaction with the smart gas data center 132. For example, the smart gas emergency maintenance management sub-platform 131 may obtain data related to gas device safety management (e.g., fault information of a gas pipeline, a gate station, and maintenance material information of a gas maintenance engineering) from the smart gas data center 132 for processing, and may send a processing result to the smart gas data center 132.

In some embodiments, the smart gas emergency maintenance management sub-platform 131 may include, but is not limited to, a device safety monitoring management module, a safety alarm management module, a work order dispatch management module, and a materials management module.

The device safety monitoring management module may be used to: check historical safety data and current operation data of device operation of the smart gas object platform. The safety alarm management module may be used to: check or remotely process safety alarm information uploaded by the smart gas object platform. The work order dispatch management module may be used to: directly switch to the work order dispatch management module through the safety alarm management module when gas maintenance engineering personnel are required to carry out on-site emergency maintenance, dispatch optimal engineering maintenance personnel according to a maintenance task requirement, and confirm and check an execution progress of a maintenance work order, etc. The materials management module may be used to: check a recipient, a category, a count, and material costs of the maintenance materials corresponding to the maintenance work order.

The smart gas data center 132 may be used to store and manage all operation information of the IoT system 100. In some embodiments, the smart gas data center 132 may be configured as a storage device (e.g., a database) for storing historical and current gas device safety management data. For example, the smart gas data center 132 may store information such as operation fault information, historical maintenance records, scheduled maintenance personnel, maintenance materials, and maintenance progress of the gas device.

In some embodiments, the smart gas safety management platform 130 may exchange information with the smart gas service platform 120 and the smart gas sensor network platform 140 respectively through the smart gas data center 132. For example, the smart gas data center 132 may send materials distribution, materials demand, etc. of gas pipeline network maintenance to the smart gas service platform 120. As another example, the smart gas data center may send an instruction for obtaining operation information of the gas device to the smart gas sensor network platform 140 (e.g., a smart gas device sensor network sub-platform), and receive the operation information of the gas device uploaded by the smart gas sensor network platform 140. In some embodiments, the smart gas data center 132 may send the demand for the maintenance materials of the gas pipeline network of each point position of the gas pipeline network to a smart gas maintenance engineering sensor network sub-platform, and feedback the demand for the maintenance materials of the gas pipeline network of each point position to a smart gas maintenance engineering object sub-platform through the smart gas maintenance engineering sensor network sub-platform to realize the distribution and scheduling of the maintenance materials.

The smart gas sensor network platform 140 may be a functional platform for managing sensor communication. In some embodiments, the smart gas sensor network platform 140 may be connected to the smart gas safety management platform 130 and the smart gas object platform 150 to realize the functions of perceptual information sensor communication and control information sensor communication.

In some embodiments, the smart gas sensor network platform 140 may include the smart gas device sensor network sub-platform and the smart gas maintenance engineering sensor network sub-platform. The smart gas device sensor network sub-platform may correspond to a smart gas device object sub-platform, and the smart gas maintenance engineering sensor network sub-platform may correspond to the smart gas maintenance engineering object sub-platform.

In some embodiments, the smart gas device sensor network sub-platform may send the operation information (e.g., fault information of a gas pipeline and a gas device) of the gas device uploaded by the smart gas device object sub-platform to the smart gas data center 132. The smart gas maintenance engineering sensor network sub-platform may send information related to the maintenance engineering (e.g., the progress of the maintenance engineering, consumption and demand of the maintenance materials, etc.) uploaded by the smart gas maintenance engineering object sub-platform to the smart gas data center 132.

The smart gas object platform 150 may be a functional platform for generating perceptual information. For example, the smart gas object platform 150 may monitor and generate the operation information (e.g., the fault information of the gas pipeline) of the gas device, and upload the operation information to the smart gas data center 132 through the smart gas sensor network platform 140.

In some embodiments, the smart gas object platform 150 may include the smart gas device object sub-platform and the smart gas maintenance engineering object sub-platform.

In some embodiments, the smart gas device object sub-platform may be configured as various types of gas devices and monitoring devices. For example, the gas device may include a pipeline network device (such as a gas pipeline, a valve control device, a gas storage tank), etc.; and the monitoring device may include a gas flow meter, a pressure sensor, a temperature sensor, etc. In some embodiments, the smart gas device object sub-platform may obtain the operation information of the gas pipeline network based on the monitoring device, and send the operation information of the gas pipeline network to the smart gas data center 132 through the smart gas device sensor network sub-platform, and the smart gas safety management platform 130 may determine a current pipeline network feature of the gas pipeline network through the smart gas emergency maintenance management sub-platform 131. In some embodiments, the smart gas device object sub-platform may also include a positioning device which may upload position information of a device that has a fault or an operation abnormality to the smart gas data center through the smart gas device sensor network sub-platform.

In some embodiments of the present disclosure, a closed-loop of smart gas emergency maintenance management information operation among the indoor device, the maintenance engineering personnel, a gas operator, and the gas user may be formed based on the IoT system 100 for predicting demand for maintenance materials of a smart gas pipeline network, which can realize informatization and intelligence of emergency maintenance management to ensure effective management.

It should be noted that the above IoT system 100 is provided for the purpose of illustration only, and is not intended to limit the scope of the present disclosure. For those skilled in the art, various modifications or changes can be made according to the description in the present disclosure. For example, the IoT system 100 may also include one or more other suitable components to achieve similar or different functions. However, changes and modifications do not depart from the scope of the present disclosure.

Figure 2:
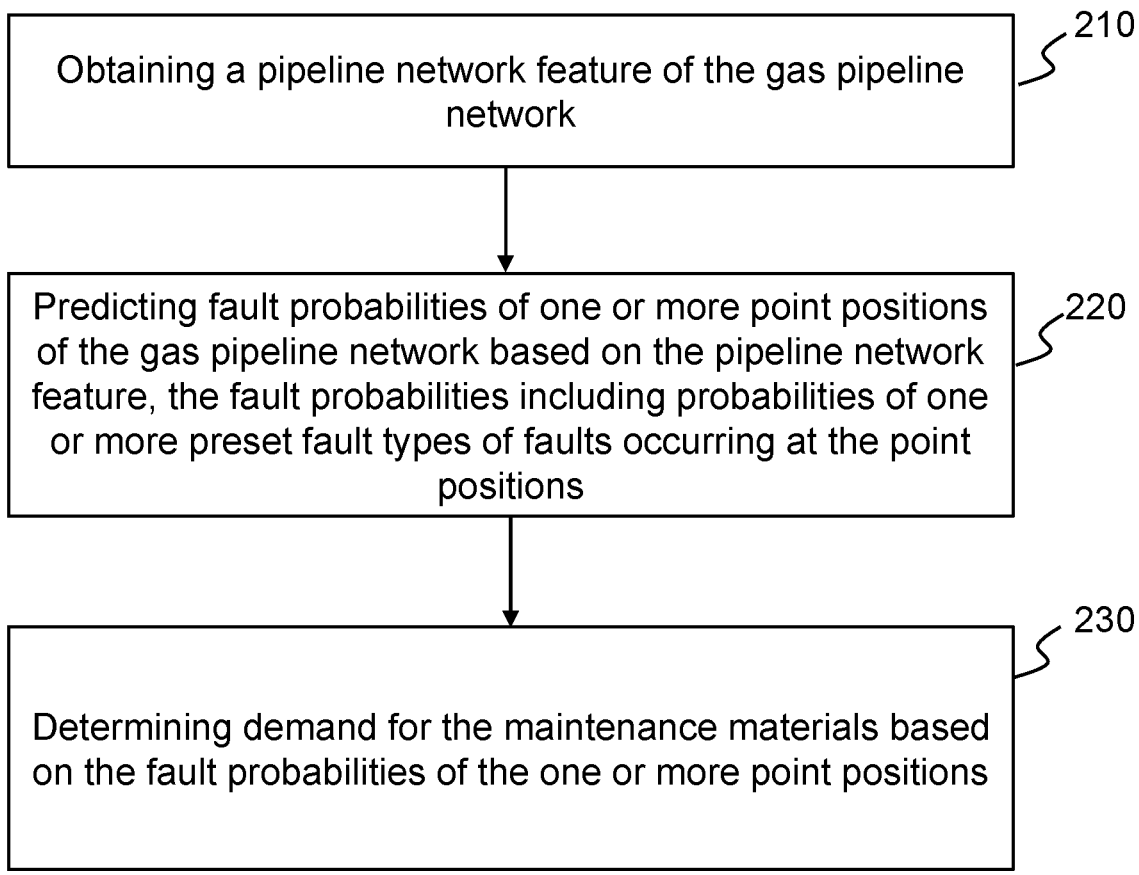
FIG. 2 is a flowchart illustrating an exemplary process of a method for predicting demand for maintenance materials of a smart gas pipeline network according to some embodiments of the present disclosure.

FIG. 2 is a flowchart of illustrating an exemplary process of a method for predicting demand for maintenance materials of a smart gas pipeline network according to some embodiments of the present disclosure.

In some embodiments, the process 200 may be performed by the smart gas safety management platform 130. As shown in FIG. 2, the process 200 may include the following operations.

In 210, obtaining a pipeline network feature of a gas pipeline network.

The pipeline network feature may characterize operation state information of the gas pipeline network. The pipeline network feature may include a gas transportation feature of a gas pipeline, such as a pressure, a flow rate, a temperature, a transportation direction, etc. of gas in the gas pipeline. The pipeline network feature may also include an operation feature of each station of the gas pipeline network, such as parameter information of gas transportation pressure (e.g., gas outlet pressure, inlet pressure) of each pressure regulation station, parameter information (e.g., a capacity of gas storage tank, a gas consumption rate, a remaining gas amount, etc.) of each gas storage station, etc.

In some embodiments, the smart gas safety management platform 130 may obtain the operation state information of the gas pipeline network from the smart gas data center 132, and determine the pipeline network feature based on the operation state information of the gas pipeline network. The operation state information of the gas pipeline network may be obtained based on the smart gas object platform 150 and sent to the smart gas data center 132 through the smart gas sensor network platform. For further description, please see FIG. 1 and description thereof.

In some embodiments, the pipeline network feature may be represented in the form of a vector or a vector matrix. For example, for the gas pipeline, the pipeline network feature may be represented by a vector (a, b, c, d, e), and values of the five elements of the vector may respectively represent an identifier of the gas pipeline, a pressure, a flow rate, a temperature, and a transportation direction of gas. For the gas storage station, the pipeline network feature may be represented by a vector (a, b, c, d), and the values of the four elements of the vector may respectively represent a gas storage station identifier, a capacity of a gas storage tank, a gas consumption rate, and a remaining gas amount. Different stations may have different counts of elements. The vectors corresponding to the a plurality of sections of the gas pipeline and a plurality of stations of the gas pipeline network may form a vector matrix used to represent the pipeline network features of the entire gas pipeline network. The representation of the pipe network feature is only used as an example here, and the pipe network feature may also be in other forms. The pipeline network feature may be stored in the smart gas center through a storage mode such as a data table and a file.

In 220, predicting fault probabilities of one or more point positions of the gas pipeline network based on the pipeline network feature, the fault probabilities including probabilities of one or more preset fault types of faults occurring at the point positions.

The point position may refer to a position where a fault may occur in the gas pipeline network. The gas pipeline network may include a plurality of point positions. The point position may represent a certain pressure regulation station or a gas storage station of the gas pipeline network. The point position may also represent a certain section of gas pipeline (e.g., a certain section of gas pipeline in area A of a city). The point position may also be any position of the gas pipeline network determined according to actual needs, for example, the point position may be an intersection point of a certain gas pipeline, a certain valve control device, etc.

In some embodiments, the smart gas safety management platform 130 may predetermine the point position according to historical operation information of the pipeline network device. For example, if a certain pressure regulation station has failed more times and more frequently in history, the pressure regulation station may be set as the point position. In some embodiments, the smart gas safety management platform 130 may also dynamically adjust (e.g., increase or cancel) the point position according to actual needs. For example, the section of gas pipeline may be set as the point position (e.g., a midpoint position of the gas pipeline) according to information such as abnormality of real-time operation state, deterioration of an environment, etc. of a certain section of gas pipeline. It is understandable that the point position also represents that a certain position of the gas pipeline network is set as a key prevention target of certain possible faults.

The preset fault types may include fault types of various pipe network devices, such as a gas leakage fault of the gas pipeline, a fracture fault of the gas pipeline, a pressure regulation device fault of the pressure regulation station, a damage fault of the gas storage tank, etc. The preset fault types may also include other types of accidents such as fire of the gate station, explosion of a compressor of a compression station, etc., which are not limited in the present disclosure.

In some embodiments, the preset fault types may be determined based on management experience of the gas field. For example, the preset fault types may be determined according to historical fault types of the gas pipeline network, may be set based on a type and an operation feature of the pipeline network device, or may also be preset based on information such as a feature of an area where the point position is located, an environmental feature, etc. It can be understood that the fault that may occur at a certain point position may be a preset fault type, or any combination thereof.

The fault probability may refer to a probability that a fault corresponding to each preset fault type occurs within a certain period of time in the future. The fault probability may be a value within an interval of [0, 1]. The larger the value is, the greater the possibility of a certain fault may occur. For example, the probability of the pressure regulation device fault occurring at a certain point position (e.g., the pressure regulation station) within one week in the future may be 0.8. As another example, the probabilities of the fracture fault and the gas leakage fault occurring at a certain point position (e.g., a certain gas pipeline position) within one month in the future may be 0.1 and 0.12, respectively.

In some embodiments, the fault probability may be expressed in the form of a vector. For example, the fault probability may be represented by a vector (a, b, c, d), where the four elements of the vector represent four preset fault types, and an value of the element represents a probability of occurrence of a fault corresponding to the element. Exemplarily, the vector (0.1, 0.3, 0.6, 0.8) may represent that the probabilities of occurrence of a fault type a, a fault type b, a fault type c, and a fault type d are 0.1, 0.3, 0.6, and 0.8, respectively. It can be understood that this vector may represent this point position has a greatest possibility of occurrence of the fault type d.

In some embodiments, the fault probability may be determined based on the pipeline network feature. For example, the smart gas safety management platform 130 may determine a matching historical pipeline network feature based on the current pipeline network feature by performing vector retrieval in the smart gas data center, and obtain a historical fault condition corresponding to the historical pipeline network feature, and determine the current fault probability based on the historical fault condition.

The fault probability may also be determined in other ways. For example, the smart gas safety management platform 130 may determine that the fault probability of gas leakage occurring at an upstream gas pipeline point position is 0.8, the fault probability of damage occurring at an upstream gas pipeline point position is 0.9, etc. based on operation information of a gas flow abnormality (e.g., a sharp decrease) of a certain section of gas pipeline. The fault probability may also be determined based on inspection information of inspection personnel.

In some embodiments, the smart gas safety management platform 130 may determine the fault probability by processing the pipeline network feature based on a probability prediction model. For the description about the probability prediction model, please refer to FIG. 3 and description thereof.

In 230, determine demand for the maintenance materials based on the fault probabilities of the one or more point positions.

The maintenance materials may refer to maintenance materials required for a maintenance operation corresponding to a certain fault type. For example, for a gas leakage fault occurring at a point position of a gas pipeline, the maintenance materials may include steel pipes, cast iron, a welding device, solder materials, etc.

In some embodiments, maintenance materials may include a plurality of preset types of material items. The material items included in the maintenance materials for different faults may be different. For example, the material items of maintenance materials required for the gas leakage fault of the gas pipeline may be: steel pipes, cast iron, a welding device, solder materials, etc. The material items of maintenance materials required for the control fault of a certain valve control device may be: special sandpaper for valve grinding, double-sided adhesive tape, bolt loosener, a wrench, etc. It is understandable that the maintenance materials may be a combination of a plurality of material items, for example, the special sandpaper for valve grinding and the wrench may be a combination of two material items. The special sandpaper for valve lapping, the bolt loosener, and the wrench may be a combination of three material items.

The demand for the maintenance materials of a certain point position of the gas pipeline network may refer to demand for each material item in the maintenance materials required when a certain fault occurs at this point position. For example, the demand for the maintenance materials for the control fault of a certain valve control device may be: 40 sheets of special sandpaper for valve grinding, 3 rolls of double-sided adhesive tape, 2 bottles of bolt looseners, 1 wrench, etc.

It should be noted that a scenario that requires the demand for the maintenance materials is not limited to a maintenance scenario when a certain fault occurs, and may also be a prevention scenario when no fault occurs. For example, a corresponding maintenance operation (e.g., prevention and maintenance work in the next week) for the fault type may be performed according to the fault probability of a certain point position to reduce the fault probability of this point position (i.e., to improve the safety of this point position), and the material demand required in this scenario may also belong to the demand for the maintenance materials described in the present disclosure.

In some embodiments, the demand for the maintenance materials of the gas pipeline network may include the demand for the maintenance materials of one or more point positions. Accordingly, the demand for the maintenance materials of the gas pipeline network may be determined based on the demand for the maintenance materials of each point position. For example, the demand for the maintenance materials may be determined based on a sum of the demand for the maintenance materials of each point position. The demand for the maintenance materials of each point position may be determined based on experience or historical maintenance data of the point position, for example, according to judgment of experienced maintenance personnel.

In some embodiments, the smart gas safety management platform 130 may determine sub-demand for maintenance materials of each point position of the one or more point positions based on the historical maintenance data, and determine the demand for the maintenance materials of the gas pipeline network based on the sub-demand. For the description about the sub-demand and determining the demand for the maintenance materials based on the sub-demand, please refer to FIG. 4 and description thereof.

In some embodiments of the present disclosure, the fault probability of each point position of the gas pipeline network may be predicted based on the pipeline network feature, and the demand for the maintenance materials of the gas pipeline network may be determined based on the fault probability, which can prevent the fault from occurring and realize distribution and scheduling of the maintenance materials of each point position in advance.

Figure 3:
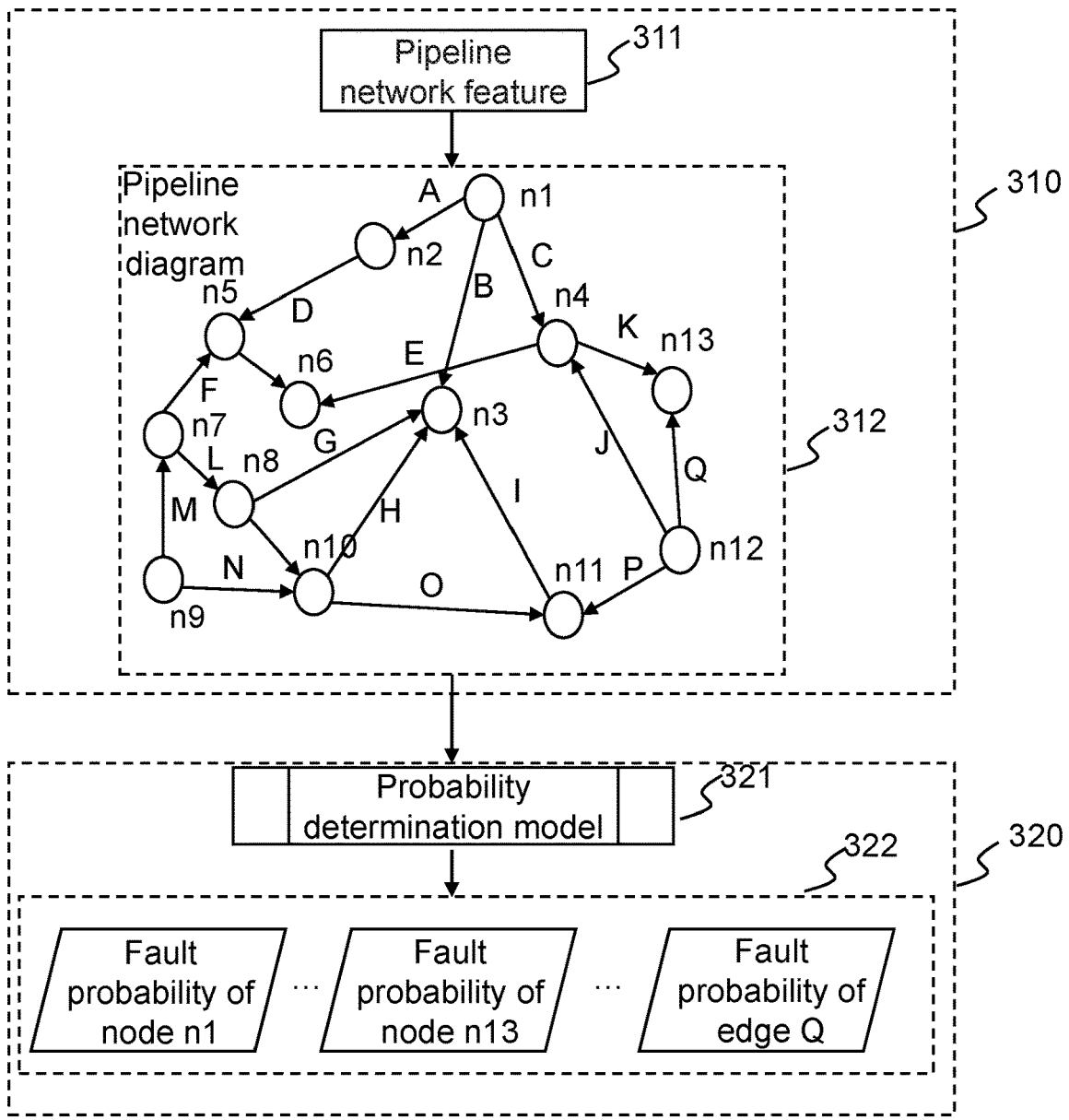
FIG. 3 is a flowchart illustrating an exemplary process for determining a fault probability of each point position of a gas pipeline network according to some embodiments of the present disclosure.

FIG. 3 is flowchart illustrating an exemplary process for determining a fault probability of each point position of a gas pipeline network according to some embodiments of the present disclosure.

In some embodiments, the process 300 may be performed by the smart gas safety management platform 130. As shown in FIG. 3, the process 300 may include the following operations.

In 310, constructing a pipeline network diagram based on the pipeline network feature. A node of the pipeline network diagram may correspond to the point position of the gas pipeline network. An edge of the pipeline network diagram may correspond to a gas pipeline of the gas pipeline network.

The pipeline network diagram may be used to represent a knowledge map of gas pipeline network information. The pipeline network diagram may include basic information, operation state information, etc. of the gas pipeline network. For example, the pipeline network diagram may include a position of a certain pressure regulation station, properties (e.g., rated power, a pressure control range) of the pressure regulation device of the pressure regulation station, operation information (e.g., a current outlet pressure, a temperature), etc.

In some embodiments, as shown in FIG. 3, the smart gas safety management platform 130 may construct the pipeline network diagram 312 based on the pipeline network feature 311.

The pipeline network diagram may include a plurality of nodes. As shown in FIG. 3, the node of the pipeline network diagram 312 may include a node n1, a node n2, a node n12, etc. The node of the pipeline network diagram may be used to represent the point position of the gas pipeline network. For example, the node of the pipeline network diagram may represent a pressure regulation station, a gas storage station, an intersection point of the gas pipelines, etc.

The node of the pipeline network diagram may include a node feature. The node feature may include a variety of information. In some embodiments, the node feature of the node of the pipeline network diagram may include a node type. The node type may be preset. For example, the node type may include a pressure regulation station type, a gas storage station type, a pipeline inflection point type, etc. The node feature may also include a historical maintenance duration, a single inspection duration, etc.

In some embodiments, the node feature of the node of the pipeline network diagram may further include node complexity. The node complexity may be used to characterize complexity of the point position corresponding to the node.

In some embodiments, the smart gas safety management platform 130 may determine the node complexity based on the node type, the historical maintenance duration, and the single inspection duration. For example, the smart gas safety management platform 130 may preset basic complexity according to the node types of different nodes, and adjust the basic complexity according to information such as the historical maintenance duration, the single inspection duration, etc. in the node feature to determine the node complexity. Exemplarily, the node complexity may be determined based on the following equation (1):

$$D_1 = T + k_1 * E_1 + k_2 * E_2 + \ldots k_n * E_n \qquad (1)$$

where $D_1$ in the equation (1) denotes the node complexity, and T denotes the basic node complexity, which may be a value within a preset interval of [0, 1] based on different node types; $E_1, E_2, \ldots, E_n$ denote mapping values corresponding to various node features, which may be values obtained by mapping various node feature values to the interval of [0, 1] based on a preset node feature mapping rule. For example, $E_1$ denotes a value obtained by mapping the node feature of the historical maintenance duration to the interval of [0, 1] based on the preset node feature mapping rule, i.e., the smart gas safety management platform 130 may divide different step lengths of the historical maintenance duration based on a maximum value or an average value of the historical maintenance duration, and map the different step lengths to values in the interval of [0, 1], such as 0.1 for 0 h-100 h, 0.2 for 100 h-200 h, 1 for the maximum value of the historical maintenance duration, etc. Similarly, $E_2$ denotes a value obtained by mapping the node feature of the single inspection duration to the interval of [0, 1] based on the preset node feature mapping rule. The same is true for other node features $E_n$; $k_1, k_2, \ldots, k_n$ denote weight coefficients, which are preset values in the interval of [0, 1] corresponding to different node features.

In some embodiments, the node complexity may be also related to a degree of the node.

The degree of the node may be used to represent a count of gas pipelines connected to the point position corresponding to the node. For example, if the count of the gas pipelines connected to a certain point position is 4, the degree of the node corresponding to this point position may be 4. It can be understood that the greater the degree of the node is, the greater the impact of the gas pipeline is on the node, the greater the node complexity is, and the greater the probability of a potential fault occurring is.

In some embodiments of the present disclosure, for the node complexity, the degree of the node may be introduced to be associated with the node complexity, so that the subsequently predicted probability that the fault occurs at the point position corresponding to the node is more accurate and more in line with an actual situation.

The pipeline network diagram may include a plurality of edges that may be used to represent the gas pipelines of the gas pipeline network.

As shown in FIG. 3, the edge of the pipe network diagram 312 may include an edge A, an edge B, an edge Q, etc. In some embodiments, the edge of the pipe network diagram 312 may be a directed edge, and a direction of the edge may represent a direction of gas transportation. For example, the edge A may represent that gas is transported from the node n1 to the node n2.

In some embodiments, the edge of the pipeline network diagram 312 may connect two nodes of the pipeline network diagram 312, which may characterize a relationship between the two connected nodes of the pipeline network diagram 312, such as a neighboring relationship, a distance relationship, etc. There may be a plurality of gas pipelines between two nodes (e.g., two gas storage stations) of the pipeline network diagram 312. Merely by way of example, if a certain gas storage station has a plurality of (e.g., 2, 3) gas pipelines laid at different angles or in different directions, and the gas pipelines converge at a same gas storage station, in this case, in the pipeline network diagram 312, a plurality of (e.g., 2, 3) edges may be connected between two nodes corresponding to the two gas storage stations according to the count of gas pipelines.

The edge of the pipeline network diagram may include an edge feature. The edge feature may include a variety of information. For example, the edge feature of the pipeline network diagram may include a length (e.g., 50 m) of the gas pipeline corresponding to the edge, and a transportation feature of gas (e.g., a gas pressure, a velocity, a flow rate, and a temperature). In some embodiments, the edge feature of the edge of the pipeline network diagram may also include a surface area, a count of surface parts (e.g., screws), a count of functional structures (e.g., valves) of the gas pipeline, etc., which is merely an example, and not intended to limit the edge feature. For example, the edge feature may also include a duration of use, a count of times of historical inspection, etc. of the gas pipeline.

In some embodiments, the edge feature of the edge of the pipeline network diagram may further include edge complexity. The edge complexity may be related to a length, a surface area, a count of surface parts, and a count of functional structures of the gas pipeline corresponding to the edge. Exemplarily, the edge complexity may be determined based on the following equation (2):

$$D_2 = r_1 * E_1 + r_2 * E_2 + r_3 * E_3 \ldots r_n * E_n \quad (2)$$

where $D_2$ in the equation (2) denotes the edge complexity. $E_1, E_2, \ldots E_n$ denote mapping values corresponding to various edge features, which may be values obtained by mapping various edge feature values to the interval of [0, 1] based on a preset edge feature mapping rule. For example, $E_1$ denotes a value obtained by mapping the edge feature of the length of the gas pipeline to the interval of [0, 1] based on the preset node feature mapping rule, i.e., the smart gas safety management platform 130 may divide different step lengths based on the length of the gas pipeline, and map the different step lengths to values in the interval of [0, 1], such as 0.1 for 0 m-50 m, 0.2 for 50 m-100 m, 1 for a maximum gas pipeline length, etc. Similarly, $E_2$, $E_3$, and $E_4$ respectively denote the values obtained by mapping the edge features of the surface area, the count of surface parts, and the count of functional structures of the gas pipeline to the interval of [0, 1] based on the preset edge feature mapping rule. The same is true for other edge features $E_n$. $r_1, r_2, r_3, \ldots r_n$ denote weight coefficients, which are preset values in the interval of [0, 1] corresponding to different edge features.

In some embodiments, the smart gas safety management platform 130 may determine the edge complexity through various calculation manners (e.g., weighted summation) according to the length, the surface area, the count of surface parts, and the count of functional structures of the gas pipeline corresponding to the edge. It can be understood that the greater the edge complexity is, the greater the probability that various types of faults occurs on the edge may be.

In some embodiments, the edge complexity may be also related to demand for the historical maintenance materials of the gas pipeline corresponding to the edge. The greater the demand for the historical maintenance materials of the gas pipeline corresponding to the edge is, the greater the edge complexity may be. For description regarding the demand for the historical maintenance materials, please refer to FIG. 2 and description thereof.

In some embodiments of the present disclosure, regarding the edge complexity of the pipeline network diagram, the subsequently predicted fault probability of the point position corresponding to the edge can be more accurate by associating the demand for the historical maintenance materials of the gas pipeline corresponding to the edge, which can be more in line with the actual situation.

In 310, predicting, based on the pipeline network diagram, the fault probabilities of one or more point positions of the gas pipeline network through a probability determination model. The probability determination model may be a machine learning model.

In some embodiments, as shown in FIG. 3, the smart gas safety management platform 130 may determine the fault probability of each node and/or edge of the pipeline network diagram 312 through the probability determination model 321 based on the pipeline network diagram 312. For the description regarding the fault probability, please refer to FIG. 2 and description thereof.

The probability determination model 321 may refer to a model for determining the fault probability of the node and/or edge of the pipeline network diagram. In some embodiments, the probability determination model 321 may be a trained machine learning model. For example, the probability determination model 321 may include a recurrent neural networks model, a convolutional neural networks model, other custom model structures, or the like, any combination thereof.

In some embodiments, the probability determination model may be a trained graph neural networks model. As shown in FIG. 3, the smart gas safety management platform 130 may input the pipeline network diagram 312 into the probability determination model 321, process the pipeline network diagram 312 through the probability determination model 321, and output the fault probability 322 of each node of the pipeline network diagram and/or each edge of the pipeline network diagram based on the node of the pipeline network diagram 312 and/or the edge of the pipeline network diagram 312. For example, the fault probability of the node n1 may be output based on the node n1, the fault probability of the node n13 may be output based on the node n13, the fault probability of the edge Q may be output based on the edge Q, etc.

In some embodiments, the probability determination model may be obtained by training a plurality of sample pipeline network diagrams with labels. The sample pipeline network diagrams may be a plurality of historical pipeline network diagrams. The label may be determined based on historical fault information of the point position corresponding to the node or edge of the sample pipeline network diagram within a preset time threshold (e.g., one day in the future, one week in the future). For example, if a fault of a fault type a occurs at the point position of the gas pipeline network corresponding to a certain node or edge within the preset time threshold after a historical moment corresponding to the sample pipeline network diagram, in the label corresponding to the node or edge, the probability value corresponding to the fault type a may be set as 1, and the probability values corresponding to other preset fault types may be set as 0. The label may be labeled manually.

When training an initial probability determination model, the smart gas safety management platform 130 may input each sample pipeline network diagram into the probability determination model, process the sample pipeline network diagram through the probability determination model, and output the fault probability of each node and edge based on the node and edge of the sample pipeline network diagram. The smart gas safety management platform 130 may construct a loss function based on the label of each sample pipeline network diagram and the output of the probability determination model, and iteratively update parameters of the probability determination model based on the loss function until a preset condition is satisfied, complete the training, and obtain a trained probability determination model. The preset condition may be that the loss function is smaller than a threshold, the loss function converges, or a training period reaches a threshold.

In some embodiments, the smart gas safety management platform 130 may determine the fault probability of the point position corresponding to each node and edge of the pipeline network diagram based on the output fault probability of each node and edge of the pipeline network diagram.

As shown in FIG. 3, the smart gas safety management platform 130 may determine the fault probabilities of the point positions of the gas pipeline network corresponding to the node n1, the node n3, and the edge Q based on the fault probabilities of the node n1, the node n3, and the edge Q (other nodes and edges are not shown).

In some embodiments, the smart gas safety management platform 130 may determine a safety level, a safety warning, etc. of each point position based on the fault probability of each point position corresponding to each node and edge of the pipeline network diagram. For example, for a point position with a relatively large fault probability, the smart gas safety management platform 130 may alert in the form of sending a message, broadcast etc. In some embodiments, the smart gas safety management platform 130 may determine the demand for the maintenance materials of each point position based on the fault probability to perform material scheduling, etc. For the relevant description, please refer to FIG. 4 and description thereof.

In some embodiments of the present disclosure, the pipeline network diagram may be processed through the probability determination model, and the fault probability of each point position of the gas pipeline network corresponding to the node and/or edge of the pipeline network diagram may be quickly obtained, which can improve the efficiency of prediction, save manpower, time, and material costs, and the obtained result of fault probability can be more accurate.

FIG. 4 is a flowchart illustrating an exemplary process for determining demand for maintenance materials of each point position according to some embodiments of the present disclosure.

In some embodiments, the process 400 may be performed by the smart gas safety management platform 130. As shown in FIG. 4, the process 400 may include the following operations.

In 410, determining sub-demand for the maintenance materials of each point position based on the fault probabilities of the point positions. The sub-demand may be obtained based on historical maintenance data of the gas pipeline network.

The sub-demand may refer to demand for the maintenance materials of each point position of one or more point positions of the gas pipeline network. For example, if there are currently n point positions of the gas pipeline network (n is an integer greater than 1), for the entire gas pipeline network, the demand for the maintenance materials of one of the n point positions may be the sub-demand.

The historical maintenance data may refer to data related to maintenance operations of the gas pipeline network in a past period of time, such as data about the maintenance operations for the past month and past six months. The historical maintenance data may include basic information such as point position information, maintenance personnel and quantity, start and end times of maintenance, etc.

The historical maintenance data may also include historical fault information, such as a type of fault that occur specifically at the point position, or any combination thereof. In some embodiments, the historical fault information may include a historical fault probability. The historical fault probability may represent a predicted probability of each preset fault type of fault corresponding to a certain point position at a certain historical moment. Exemplarily, the historical fault probability may be the fault probability of the node and/or edge of the pipeline network diagram corresponding to the point position determined based on the probability prediction model at the certain historical moment. For the relevant description of the probability prediction model, please refer to FIG. 3 and description thereof.

The historical maintenance data may also include maintenance materials information, such as the type, demand, consumption, etc. of the maintenance materials for a certain maintenance operation. The maintenance material information may include details of the maintenance materials, which may be represented based on a material item of the maintenance materials. For the relevant description of the material item, please refer to FIG. 3 and description thereof.

In some embodiments, the historical maintenance data may be historical data obtained by the smart gas object platform 150 and finally stored in the smart gas data center 132. Exemplarily, the historical maintenance data may be a plurality of pieces of data table record of the historical maintenance data corresponding to each point position. Each piece of data table record may include the maintenance data (e.g., the fault information, the maintenance material information, etc.) of a certain historical maintenance operation at a certain point position. The historical maintenance data may also be stored in other data forms such as a file, a work order, etc.

In some embodiments, for a certain point position, the smart gas safety management platform 130 may determine the sub-demand corresponding to the point position through various analysis manners. For example, the smart gas safety management platform 130 may perform analysis and processing such as counting, filtering, induction, etc. on the historical maintenance data of a certain point position in the past six months to determine the sub-demand corresponding to the point position.

In some embodiments, the smart gas safety management platform 130 may determine the sub-demand based on the fault probability of each point position. For example, the smart gas safety management platform 130 may obtain the historical maintenance data of a certain point position, determine the historical fault probability corresponding to each piece of historical maintenance data record based on a plurality of pieces of historical maintenance data record to perform similarity calculation on a current predicted fault probability and each historical fault probability of the plurality of historical fault probabilities. The similarity calculation may be to calculate a vector distance (such as a Euclidean distance, a cosine distance, etc.) between the current predicted fault probability and each historical fault probability, and obtain n historical fault probabilities with vector distances smaller than a preset vector distance threshold as similar historical fault probabilities. The smaller the vector distance is, the greater the similarity may be. The smart gas safety management platform 130 may further obtain n pieces of historical maintenance material information in the historical maintenance data corresponding to the n historical fault probabilities.

In some embodiments, for the n pieces of historical maintenance material information, the smart gas safety management platform 130 may determine the sub-demand corresponding to the point position in various ways. For example, the smart gas safety management platform 130 may calculate an average value of the demand for each material item in the n historical maintenance materials to obtain the sub-demand.

In some embodiments, the smart gas safety management platform 130 may also use the demand for the historical maintenance materials corresponding to the fault probability with a greatest similarity as the sub-demand, which is not limited in the present disclosure.

In some embodiments, the sub-demand for the maintenance materials of one or more point positions of the gas pipeline network may be also related to frequency of a maintenance material item combination of each point position. The frequency of the maintenance material item combination may be determined based on the historical maintenance data and a support degree of the gas pipeline network. Exemplarily, the smart gas safety management platform 130 may determine a plurality of material item combinations based on material item information of each historical maintenance material in the n pieces of historical maintenance material information, and then determine the frequency of the material item combination according to the support degree. For further description, please refer to FIG. 5 and description thereof.

In some embodiments, the sub-demand for the maintenance materials of one or more point positions of the gas pipeline network may be also related to point position complexity of each point position. The point position complexity may be determined based on the node complexity of the node of the pipeline network diagram corresponding to the point position, for example, the point position complexity may be equal to the node complexity of the node corresponding to the point position. For the relevant description of the node complexity, please refer to FIG. 3 and description thereof.

In some embodiments, the smart gas safety management platform 130 may preset a complexity threshold, such as 0.6. When the point position complexity of a certain point position is greater than the complexity threshold, the sub-demand corresponding to the point position may be up-regulated. For example, a difference between the point position complexity and the complexity threshold may be calculated, and an up-regulating magnitude of the sub-demand may be determined based on a preset correspondence relationship between the difference and an up-regulating proportion of the sub-demand. Exemplarily, when the difference is 0.1, the up-regulating proportion of the sub-demand may be 10%, and when the difference is 0.2, the up-regulating proportion of the sub-demand may be 20%, which is an example only, and is not intended to limit. For example, the up-regulating proportion of the sub-demand may be a fixed value determined based on experience, such as 15%.

In some embodiments of the present disclosure, for the sub-demand corresponding to each point position of the gas pipeline network, the sub-demand may be regulated by introducing the point position complexity, so that an actual situation of the point position may be fully considered when the sub-demand is determined, which can help to prepare the maintenance materials prepared for the point positions more adequate and reasonable.

In 420, determining the demand for the maintenance materials based on the sub-demand of each point position of the gas pipeline network.

In some embodiments, the smart gas safety management platform 130 may sum the sub-demand of each point position of the gas pipeline network, and use the sum as the demand for the maintenance materials of the gas pipeline network. Exemplarily, if the maintenance materials of a point position P1 include: 40 sheets of special sandpaper for valve grinding, 3 rolls of double-sided adhesive tape, 2 bottles of bolt looseners, and 1 wrench, and the maintenance materials of a point position P2 include: 20 pieces of special sandpaper for grinding, 2 kg of kerosene, 1 spool, and 1 wrench, the demand for the maintenance materials of the gas pipeline network may be the sum of the demand of the point position P1 and the point position P2, i.e., 40+20=60 pieces of special sandpaper for valve grinding, 3+0=3 rolls of double-sided adhesive tape, 2+0=2 bottles of bolt looseners, 1+1=2 wrenches, 0+2=2 kg of kerosene, and 0+1=1 spool.

In some embodiments, the smart gas safety management platform 130 may also correct the demand for the maintenance materials of the gas pipeline network based on the frequency of the material item combination to determine a final demand for the maintenance materials. For further description, please refer to FIG. 5 and description thereof.

In some embodiments of the present disclosure, the demand for the maintenance materials of the plurality of point positions of the gas pipeline network may be determined through the sub-demand corresponding to each point position, which can make the distribution of maintenance materials of the entire gas pipeline network more targeted. Meanwhile, considering the point position complexity can also help make the scheduling of materials more in line with the actual situation.

Figure 5:
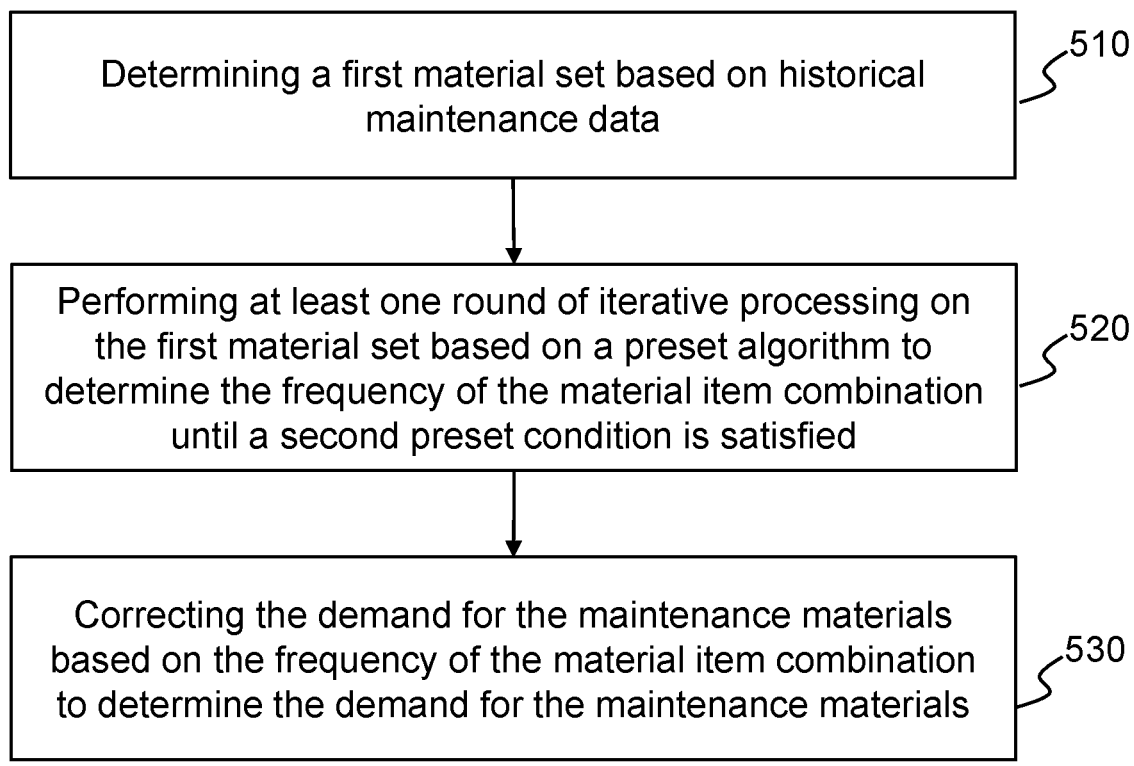
FIG. 5 is a flowchart illustrating an exemplary process for determining frequency of a material item combination of maintenance materials according to some embodiments of the present disclosure.

FIG. 5 is a flowchart illustrating an exemplary process for determining frequency of a material item combination of maintenance materials according to some embodiments of the present disclosure.

In some embodiments, the process 500 may be executed by the smart gas safety management platform 130. As shown in FIG. 5, the process 500 may include the following operations.

In 510, determining a first material set based on historical maintenance data.

The historical maintenance data may include a plurality of pieces of historical maintenance record of each point position of the gas pipeline network. Each piece of historical maintenance record may include a corresponding piece of maintenance materials record. The maintenance material record may include information of a combination of one or more maintenance material items. For the relevant description of the historical maintenance data, please refer to FIG. 4 and description thereof.

The first material set may refer to a data set of an initial material item combination. For example, the first material set may be a data set of one material item, a data set of a combination of two material items, a data set of a combination of three material items, etc. For the relevant description of the material item and the material item combination, please refer to FIG. 2 and description thereof.

In some embodiments, the smart gas safety management platform 130 may combine different material items based on a preset rule according to a plurality of material items recorded in each maintenance material record in the historical maintenance data to determine the first material set. Exemplarily, the material items may be combined according to a name of the material item. For example, the first material set may be a data set composed of various combinations with a wrench as a basic material item, such as a combination of a wrench and double-sided adhesive tape, a combination of a wrench and a screwdriver, and a combination of a wrench, double-sided adhesive tape, and a screwdriver. In the next iteration, the first material set may be a data set composed of various combinations with an oxygen cylinder as a basic material item. The way to combine the material items is merely provided herein as an example. The smart gas safety management platform 130 may also combine the material items in other ways, please see the description below for details.

In 520, performing at least one round of iterative processing on the first material set based on a preset algorithm to determine the frequency of the material item combination until a second preset condition is satisfied.

The frequency of the material item combination may refer to frequency of each material item combination appearing in the historical maintenance data. The material item combination frequency may be a value in the interval of [0, 1], such as 1, 0.5, etc. For the convenience of expression, the frequency of the material item combination may also be referred to as a combination frequency or a frequency below.

In some embodiments, the frequency of the material item combination may be determined based on a proportion of a count of occurrences of a certain material item combination in the historical maintenance data. For example, if the historical maintenance data includes 100 pieces of historical maintenance records, 80 of the 100 pieces of historical maintenance records may include a material item combination (e.g., 1 wrench and 1 bottle of bolt loosener), the frequency of the material item combination may be 80/100=0.8.

In some embodiments, the smart gas safety management platform 130 may separately count the proportion of a count of occurrences of each material item combination in the historical maintenance data, and then determine the frequency of each material item combination.

In some embodiments, the smart gas safety management platform 130 may perform the at least one round of iterative processing on the first material set based on the preset algorithm to determine the frequency of each material item combination.

In some embodiments, each round of the at least one round of iterative processing based on the preset algorithm may include the following operations S1 to S3:

In S1, determining a second material set that satisfies a screening condition based on the first material set. The first material set may include a plurality of first material item combinations with a same count of items. The screening condition may include that the proportion of occurrences of each first material item combination in the historical maintenance data is greater than the support degree.

The second material set may refer to a data set of material item combinations after the first material set is screened. The second material set may be a subset of the first material set.

The first material item combination may refer to elements of the first material set and/or the second material set. For example, a count of first material item combinations in the first material set may be 50, representing that there are 50 elements of the first material set.

In some embodiments, the first material item combination in the operation S1 may be a k-element combination, i.e., the count of items in the first material item combination may be k. k is a positive integer greater than or equal to 1.

k may be determined based on a count of rounds of iteration. For example, when the current round of iteration is 1 (i.e., the first round of iteration), the first material item combination may be a 1-element combination, i.e., the count of items in the first material item combination may be 1. When the current round of iteration is 2 (i.e., the second round of iteration), the first material item combination may be a 2-element combination, i.e., the count of items in the first material item combination may be 2, representing a combination of 2 material items and so on.

The support degree may be a preset ratio value. The support degree may be a value in the interval of [0, 1], such as 0.5.

In some embodiments, the smart gas safety management platform 130 may perform traversal retrieval in the historical maintenance data based on each first material item combination in the first material set. When a piece of historical maintenance material record in the historical maintenance data contains the first material item combination, the count of occurrences of the first material item combination may be accordingly accumulated by 1.

In some embodiments, the smart gas safety management platform 130 may determine the frequency of the first material item combination based on a ratio of a total count of occurrences of each first material item combination to a total count of pieces of historical maintenance data record. When the frequency is greater than the support degree, the first material item combination may be used as the element of the second material set. Exemplarily, if a certain first material item combination in the first material set is (wrench, bolt loosener), and the frequency is 0.8 which is greater than the support degree of 0.5, then the first material item combination (wrench, bolt loosener) may be selected into the second material set.

It can be understood that each element in the screened second material set is the first material item combination with the frequency greater than the support degree.

In some embodiments, the screening condition may further include that a quantity of each material item of the first material item combination satisfies a confidence level condition. The confidence level of a material item may represent a degree of confidence that a certain material is required in a historical maintenance operation. The confidence level may be determined based on a difference between the quantity of each material item in the first material item combination and a mean value of the quantity of the material item. The greater the difference is, the lower the confidence level of the corresponding material item may be. For example, after obtaining the first material item combination of ABC that satisfies the support degree, the smart gas safety management platform 130 may calculate the mean values of the quantity of a material item A, a material item B, and a material item C in the historical maintenance data (e.g., 100 pieces of maintenance data including the first material item combination) as $V_a$, $V_b$, and $V_c$, respectively. When a ratio of the quantity Vat of the material item A in a piece of historical maintenance data to the mean value $V_a$ of the material item A is $P_a = V_{a1}/V_a$, and $P_a$ is smaller than a preset quantity ratio threshold (e.g., 0.2), it may be determined that the confidence level of the material item A does not satisfy the condition.

Accordingly, the first material item combination contained in the piece of historical maintenance data may not satisfy the screening condition. The same is true for the calculation of the material item B and the material item C. The preset quantity ratio threshold may be set based on experience, and the quantity ratio thresholds corresponding to different material items may be different.

In some embodiments, the support degree may be related to the node complexity of each node and/or the edge complexity of each edge of the pipeline network diagram. For the relevant description of the node complexity and the edge complexity, please refer to FIG. 3 and description thereof.

In some embodiments, the support degree may be determined based on the following equation (3):

$$S = S_0 + k_1 * D_1 + k_2 * D_2 \quad (3)$$

where S in the equation (3) denotes the support degree, $S_0$ denotes a basic support degree, which may be a preset value, such as 0.5; $D_1$ denotes the node complexity of the gas pipeline network, and $D_2$ denotes the edge complexity of the gas pipeline network; $k_1$ and $k_2$ are preset weight coefficients greater than 0, where $k_1$ may be greater than $k_2$, representing that the node complexity has a greater impact on the support degree than the edge complexity. For example, $k_1 = 0.4$, and $k_2 = 0.2$;

In some embodiments, the node complexity $D_1$ of the gas pipeline network may be determined based on a mean value of the node complexity of all the nodes of the gas pipeline network. The edge complexity $D_2$ of the gas pipeline network may be determined based on a mean value of the edge complexity of all the edges of the gas pipeline network.

It is understandable that the greater the node complexity and/or the edge complexity of the gas pipeline network, the more complex the actual situation of the corresponding point position of the gas pipeline network is, the more the types of maintenance materials potentially required is, the more stringent the requirement for the material item combination is, and accordingly, the higher the requirement for the screening condition is.

In some embodiments of the present disclosure, for the screening of the material item combination, the node complexity and/or the edge complexity of the gas pipeline network graph may be by introduced to improve the support degree, which can be helpful to put forward a higher requirement for the material item combination of the maintenance materials, and at the same time, can help to obtain a more convincing material item combination.

In S2, determining a third material set based on the second material set. The third material set may include a plurality of second material item combinations with a same count of items. The second material item combinations may be generated based on a combination of a plurality of different material items in the first material item combination. The count of items of each second material item combination may be greater than the count of items of the first material item combination.

The third material set may refer to a data set generated by recombining the material items of the material item combination of the second material set.

In some embodiments, the smart gas safety management platform 130 may obtain the material item of each element of the second material set, combine a plurality of material items to generate a plurality of second material item combinations, and then obtain the third material item set. A count of items of the second material item combination may be greater than a count of items of the first combination. In some embodiments, the second material item combination may be a k'-element combination, and k'>k. For example, k'=k+1.

Exemplarily, the smart gas safety management platform 130 may obtain a sequence of the plurality of material items based on each element of the second material set (the first material item combination), for example, the sequence may be A, B, C, D, E, F. A, B, C, D, E, and F may respectively be the material item (e.g., a wrench, bolt loosener, a screw, etc.). The smart gas safety management platform 130 may also sort the sequence (e.g., sorting in descending order by name, sorting in descending order by the frequency of the material items, etc.), and obtain the data set of k'-element combination through various algorithms such as sorting and combination as the third material set.

In S3, using the third material set as the first material set of a next iteration, repeating the iteration, and determining the frequency of the material item combination until the second preset condition is satisfied.

In some embodiments, the smart gas safety management platform 130 may use the third material set as the first material set of the next iteration, repeat the operations of S1 to S2 of each round of iteration to gradually screen, obtain a plurality of material item combination with a proportion of occurrences greater than the support degree until the second preset condition is satisfied, and end the iteration.

In some embodiments, the second preset condition may include that a preset count of rounds of iteration has been reached, the quantity of material items of the material item combination reaches a preset quantity threshold, the proportion of occurrences of all material item combinations of the third material set in the historical maintenance data is smaller than the support degree, or any combination thereof. Merely by way of example, an example is provided for illustration below.

During a first round of iteration: the first material set may be {A, B, C, D, E, F}, and the smart gas safety management platform 130 may perform traversal retrieval on each first material item combination of the first material set in the historical maintenance data to obtain the frequencies of elements A, B, C, D, E, and F of 0.7, 0.8, 0.3, 0.8, 0.7, and 0.2, respectively. The frequencies of the elements A, B, D, and E may be greater than the support degree, and the elements A, B, D, and E may be selected into the second material set. The second material set may be {A, B, D, E}.

The smart gas safety management platform 130 may recombine the elements A, B, D, and E of the second material set to generate a 2-element combination of the second material item combination: AB, AD, AE, BD, BE, and DE, and then generate the third material set of {AB, AD, AE, BD, BE, DE}. Then the first round of iteration may end, and at the same time, the third material set may be used as the first material set during a second round of iteration. A next round of iteration may be proceeded in response to a determination that the condition for iteration termination is not satisfied.

During the second round of iteration, the first material set may be {AB, AD, AE, BD, BE, DE}, and the smart gas safety management platform 130 may perform traversal retrieval on each first material item combination of the first material set in the historical maintenance data to obtain the frequencies of the first material item combinations AB, AD, AE, BD, BE, and DE of 0.8, 0.2, 0.4, 0.8, 0.7, and 0.6, respectively. The frequencies of the elements AB, BD, BE, and DE may be greater than 0.5, and the elements AB, BD, BE, and DE may be selected into the second material se. The second material set may be {AB, BD, BE, DE}.

The smart gas safety management platform 130 may split the first material item combination of the second material set {AB, BD, BE, DE} to obtain a plurality of material items of A, B, D, and E. The smart gas safety management platform 130 may recombine the material items of A, B, D, and E to generate a 3-element combination of second material items respectively of ABD, ABE, ADE, and BDE, and then generate a third material set of {ABD, ABE, ADE, BDE}. The second round of iteration may end, and the third material set may be used as the first material set during a third round of iteration. A next iteration may be proceeded in response to a determination that the condition for iteration termination is not satisfied. The same is true for the next round of iteration.

In some embodiments, the smart gas safety management platform 130 may obtain the third material set at the end of the $n^{th}$ round of iteration. Elements of the third material may be m second material item combinations with frequencies greater than the support degree. M may be a positive integer greater than or equal to 0. In some embodiments, if m=0, i.e., when there is no second material item combination that finally satisfies the screening condition, the smart gas safety management platform 130 may use the third material set obtained during the $(n-1)^{th}$ round of iteration as the final third material set, which is an example only, and is not intended to limit. For example, the smart gas safety management platform 130 may also set a threshold for the count of combination items, for example, 6 items. Finally, the third material set in which the count of items in the second material item combination does not exceed 6 items may be obtained.

In 530, correcting the demand for the maintenance materials based on the frequency of the material item combination to determine the demand for the maintenance materials.

In some embodiments, the smart gas safety management platform 130 may combine a plurality of second material items of the third material set as a reference material item combination for correcting the demand for the maintenance materials.

Exemplarily, the smart gas safety management platform 130 may correct the sub-demand for the maintenance materials corresponding to each point position of the gas pipeline network based on the reference material item combination. For example, if several material items of a reference material item combination appear in the current predicted maintenance materials of a certain point position, the remaining material items of the reference material item combination may be added.

Exemplarily, for the point position P1, the predicted demand for the maintenance materials may include 20 sheets of special sandpaper for grinding, 2 kg of kerosene, 1 spool, and 1 wrench. If a reference material item combination is (special sandpaper for grinding, wrench, bolt loosener), the maintenance materials of the point position P1 may be supplemented with the bolt loosener on the basis of the original predicted maintenance materials.

It should be noted that there may be a plurality of reference material item combinations. The smart gas safety management platform 130 may sort in descending order based on the frequencies of the plurality of reference material item combinations, and use a highest-ranked reference material item combination as the target reference material item combination. Exemplarily, for the above-mentioned current predicted demand for the maintenance materials: 20 sheets of special sandpaper for grinding, 2 kg of kerosene, 1 spool, and 1 wrench. The reference material item combination may include: a reference material item combination 1 (sandpaper for grinding, wrench, bolt loosener) with the frequency of 0.7, and a reference material item combination 2 (sandpaper for grinding, wrench, red lead powder) with the frequency of 0.8, at this time, the smart gas safety management platform 130 may use the reference material item combination 2 with the highest frequency as the final reference material item combination. That is, the red lead powder may be added on the basis of the original maintenance materials.

In some embodiments, for one or more material items added to the maintenance materials, the demand may be determined based on the quantity of the material item corresponding to the reference material item combination in the historical maintenance data. For example, the demand may be determined based on the mean value of quantity of the added material item in the historical maintenance data. Exemplarily, for the reference material item combination (sandpaper for grinding, wrench, red lead powder), the current additional material item may be the red lead powder. The smart gas safety management platform 130 may obtain a plurality of pieces of historical maintenance material record (e.g., n items) containing the reference material item combination and the quantity of red lead powder in each record, and use the mean value of the demand for the red lead powder (such as 500 g) as the demand for added red lead powder this time.

In some embodiments, the demand may also be determined based on a maximum quantity configuration ratio of the material item to be added to other material items of a plurality of reference combinations. Exemplarily, the quantity configuration ratio of the material item B to the material item A of the reference material item combination (A, B) may be 2:1; the quantity configuration ratio of the material item C to the material item A of the reference material item combination (A, C) may be 3:1. The quantity configuration ratio may be a configuration ratio of the mean value of quantity of each material item in a plurality of pieces of historical maintenance data. If the currently predicted maintenance materials include the material item A, the material item that can be added may be a candidate material item B or material item C according to the above two reference material item combinations. At this time, according to the quantity configuration ratio of the material item C to the material item A of 3:1 that is greater than the quantity configuration ratio of the material item B to the material item A of 2:1, and the smart gas safety management platform 130 may use the material item C as the final additional material item. At the same time, the quantity of the added material item C may be set to be three times that of the material item A according to the material item A in the current predicted maintenance materials.

In some embodiments of the present disclosure, the demand for the maintenance materials may be corrected by the frequency of the material item combination, which can avoid potential shortage of maintenance material types, so that the maintenance materials can be more fully prepared, and the maintenance operation can be fully guaranteed.

It should be noted that, the above descriptions about the process are provided merely for illustration and description, and not intended to limit the scope of the present disclosure. For those skilled in the art, various modifications and changes can be made to the process under the guidance of the present disclosure. However, such modifications and changes are still within the scope of the present disclosure.

One of the embodiments of the present disclosure provides a non-transitory computer-readable storage medium storing computer instructions. When reading the computer instructions in the storage medium, a computer may implement the method for predicting demand for maintenance materials of a smart gas pipeline network.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for predicting demand for maintenance materials of a smart gas pipeline network, implemented based on a smart gas safety management platform of an Internet of Things (IoT) system for predicting demand for maintenance materials of a smart gas pipeline network, wherein the IoT system comprises a smart gas user platform, a smart gas service platform, a smart gas sensor network platform, and a smart gas object platform; wherein
- the smart gas user platform includes a gas user sub-platform and a supervision user sub-platform;
- the smart gas service platform includes a smart gas use service sub-platform corresponding to the gas user sub-platform, and a smart supervision service sub-platform corresponding to the supervision user sub-platform;
- the smart gas safety management platform includes a smart gas emergency maintenance management sub-platform and a smart gas data center, and the smart gas emergency maintenance management sub-platform includes a device safety monitoring management module, a safety alarm management module, a work order dispatch management module, and a material management module;
- the smart gas sensor network platform includes a smart gas device sensor network sub-platform and a smart gas maintenance engineering sensor network sub-platform; and
- the smart gas object platform includes a smart gas device object sub-platform and a smart gas maintenance engineering object sub-platform; and
- the method comprises:
- obtaining a pipeline network feature of a gas pipeline network;
- predicting fault probabilities of one or more point positions of the gas pipeline network based on the pipeline network feature, the fault probabilities including probabilities of one or more preset fault types of faults occurring at the point positions;
- determining sub-demand for the maintenance materials of each point position based on the fault probability of each point position of the one or more point positions, the sub-demand being obtained based on historical maintenance data of the gas pipeline network;
- determining the demand for the maintenance materials based on the sub-demand of each point position of the gas pipeline network; and
- transmitting the demand for the maintenance materials to the smart gas user platform based on the smart gas service platform.

2. The method of claim 1, wherein the sub-demand for the maintenance materials of each point position is also related to point position complexity of each point position.

3. The method of claim 1, wherein the sub-demand for the maintenance materials of each point position is also related to frequency of a material item combination of the maintenance materials of each point position, the frequency of the material item combination refers to frequency of each material item combination appearing in historical maintenance data, and the frequency of the material item combination is determined based on the historical maintenance data and a support degree of the gas pipeline network.

4. The method of claim 3, further comprising:
- determining a first material set based on the historical maintenance data, the first material set referring to a data set of an initial material item combination;
- performing at least one round of iterative processing on the first material set based on a preset algorithm to determine the frequency of the material item combination until a second preset condition is satisfied; and
- correcting the demand for the maintenance materials based on the frequency of the material item combination to determine final demand for the maintenance materials.

5. The method of claim 4, wherein each of the at least one round of iterative processing includes:
- determining a second material set that satisfies a screening condition based on the first material set, wherein the second material set refers to a data set of material item combinations after the first material set is screened, the second material set is a subset of the first material set, the first material set includes a plurality of first material item combinations with a same count of items, and the screening condition includes that a proportion of occurrences of each first material item combination in the historical maintenance data is greater than the support degree;
- determining a third material set based on the second material set, wherein the third material set includes a plurality of second material item combinations with a same count of items, the second material item combinations are generated based on a combination of a plurality of different material items in the first material item combination, and a count of items of each second material item combination is greater than a count of items of the first material item combination; and
- using the third material set as the first material set of a next iteration, repeating the iterative processing, and determining the frequency of the material item combination until the second preset condition is satisfied, wherein during a first round of iteration, the first material set is determined based on the historical maintenance data; and during an nth round of iteration, the first material set is determined based on the third material set determined in a previous round of iteration, and n is greater than 1.

6. The method of claim 3, wherein the support degree is related to node complexity of each node or edge complexity of each edge of a pipeline network diagram, a node of the pipeline network diagram corresponds to the point position of the gas pipeline network, an edge of the pipeline network diagram corresponds to a gas pipeline of the gas pipeline network, and the pipeline network diagram is constructed based on the pipeline network feature.

7. The method of claim 6, wherein a node feature of the node of the pipeline network diagram includes the node complexity; and the node complexity is related to a type, a historical maintenance duration, and a single inspection duration of the point position corresponding to the node.

8. The method of claim 7, wherein the node complexity is also related to a degree of the node.

9. The method of claim 6, wherein an edge feature of the edge of the pipeline network diagram includes the edge complexity; and the edge complexity is related to a length, a surface area, a count of surface parts, and a count of functional structures of the gas pipeline corresponding to the edge.

10. The method of claim 9, wherein the edge complexity is also related to demand for historical maintenance materials of the gas pipeline corresponding to the edge.

11. A non-transitory computer-readable storage medium storing computer instructions, wherein when reading the computer instructions in the storage medium, a computer implements the method for predicting the demand for the maintenance materials of the smart gas pipeline network of claim 1.

12. The method of claim 1, wherein the predicting fault probabilities of one or more point positions of the gas pipeline network based on the pipeline network feature includes:

predicting, based on a pipeline network diagram, the fault probabilities of the one or more point positions of the gas pipeline network through a probability determination model, the probability determination model being a machine learning model.

13. An Internet of Things (IoT) system for predicting demand for maintenance materials of a smart gas pipeline network, comprising: a smart gas user platform, a smart gas service platform, a smart gas safety management platform, a smart gas sensor network platform, and a smart gas object platform; wherein the smart gas user platform includes a gas user sub-platform and a supervision user sub-platform;

the smart gas service platform includes a smart gas use service sub-platform corresponding to the gas user sub-platform, and a smart supervision service sub-platform corresponding to the supervision user sub-platform;

the smart gas safety management platform includes a smart gas emergency maintenance management sub-platform and a smart gas data center, and the smart gas emergency maintenance management sub-platform includes a device safety monitoring management module, a safety alarm management module, a work order dispatch management module, and a material management module;

the smart gas sensor network platform includes a smart gas device sensor network sub-platform and a smart gas maintenance engineering sensor network sub-platform;

the smart gas object platform includes a smart gas device object sub-platform and a smart gas maintenance engineering object sub-platform;

the smart gas object platform is configured to obtain a pipeline network feature of a gas pipeline network, and transmit the pipeline network feature to the smart gas safety management platform through the smart gas sensor network platform; and the smart gas safety management platform is configured to:

predict fault probabilities of one or more point positions of the gas pipeline network based on the pipeline network feature, the fault probabilities including probabilities of one or more preset fault types of faults occurring at the point positions;

determine sub-demand for the maintenance materials of each point position based on the fault probability of each point position of the one or more point positions, the sub-demand being obtained based on historical maintenance data of the gas pipeline network;

determine the demand for the maintenance materials based on the sub-demand of each point position of the gas pipeline network;

transmit the demand for the maintenance materials to the smart gas user platform based on the smart gas service platform; and send the demand for the maintenance materials to the smart gas maintenance engineering object sub-platform based on the smart gas maintenance engineering sensor network sub-platform.

14. The IoT system of claim 13, wherein the sub-demand for the maintenance materials of each point position is also related to frequency of a material item combination of the maintenance materials of each point position, the frequency of the material item combination refers to frequency of each material item combination appearing in historical maintenance data, and the frequency of the material item combination is determined based on the historical maintenance data and a support degree of the gas pipeline network.

15. The IoT system of claim 14, wherein the smart gas safety management platform is further configured to:

determine a first material set based on the historical maintenance data, the first material set referring to a data set of an initial material item combination;

perform at least one round of iterative processing on the first material set based on a preset algorithm to determine the frequency of the material item combination until a second preset condition is satisfied; and correct the demand for the maintenance materials based on the frequency of the material item combination to determine final demand for the maintenance materials.

16. The IoT system of claim 15, wherein the smart gas safety management platform is further configured to:

determine a second material set that satisfies a screening condition based on the first material set, wherein the second material set refers to a data set of material item combinations after the first material set is screened, the second material set is a subset of the first material set, the first material set includes a plurality of first material item combinations with a same count of items, and the screening condition includes that a proportion of occurrences of each first material item combination in the historical maintenance data is greater than the support degree;

determine a third material set based on the second material set, wherein the third material set includes a plurality of second material item combinations with a same count of items, the second material item combinations are generated based on a combination of a plurality of different material items in the first material item combination, and a count of items of each second material item combination is greater than a count of items of the first material item combination; and use the third material set as the first material set of a next iteration, repeat the iterative processing, and determine the frequency of the material item combination until the second preset condition is satisfied, wherein during a first round of iteration, the first material set is determined based on the historical maintenance data; and during an nth round of iteration, the first material set is determined based on the third material set determined in a previous round of iteration, and n is greater than 1.

17. The IoT system of claim 14, wherein the support degree is related to node complexity of each node or edge complexity of each edge of a pipeline network diagram, a node of the pipeline network diagram corresponds to the point position of the gas pipeline network, an edge of the pipeline network diagram corresponds to a gas pipeline of the gas pipeline network, and the pipeline network diagram is constructed based on the pipeline network feature.

18. The IoT system of claim 17, wherein a node feature of the node of the pipeline network diagram includes the node complexity; and the node complexity is related to a type, a historical maintenance duration, and a single inspection duration of the point position corresponding to the node.

19. The IoT system of claim 18, wherein the node complexity is also related to a degree of the node.

20. The IoT system of claim 17, wherein an edge feature of the edge of the pipeline network diagram includes the edge complexity; and the edge complexity is related to a length, a surface area, a count of surface parts, and a count of functional structures of the gas pipeline corresponding to the edge.

* * * * *